United States Patent
McGuire

(10) Patent No.: US 6,240,612 B1
(45) Date of Patent: *Jun. 5, 2001

(54) METHOD FOR THE LINING OF EXISTING PIPES

(75) Inventor: Brian Edward McGuire, Oldham (GB)

(73) Assignee: British Gas plc, Berkshire (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,396

(22) Filed: Jun. 2, 1997

Related U.S. Application Data

(63) Continuation of application No. 08/079,991, filed on Mar. 5, 1993, now abandoned, which is a continuation of application No. 07/866,365, filed on Apr. 10, 1992, now abandoned, which is a division of application No. 07/799,096, filed on Nov. 27, 1991, now Pat. No. 5,214,835, which is a division of application No. 07/552,900, filed on Jul. 16, 1990, now abandoned, which is a division of application No. 07/349,085, filed on May 9, 1989, now abandoned.

(30) Foreign Application Priority Data

May 9, 1988 (GB) .................................................. 88 10894

(51) Int. Cl.$^7$ ................................ B23P 6/00; B23P 19/04
(52) U.S. Cl. .................................... 29/402.02; 29/402.09; 29/451; 29/234; 138/97
(58) Field of Search ................ 29/234, 235, 402.02, 29/402.09, 450, 451; 138/97, 98; 264/230; 493/271, 293

(56) References Cited

U.S. PATENT DOCUMENTS

| | | | |
|---|---|---|---|
| 489,950 | * 1/1893 | Harrington | 29/234 X |
| 2,794,758 | * 6/1957 | Harper et al. | 29/234 X |
| 3,139,677 | * 7/1964 | Goldstein | 29/234 X |
| 3,462,825 | * 8/1969 | Pope et al. | 29/451 |
| 3,551,983 | * 1/1971 | Newbury | 29/234 |
| 4,777,984 | * 10/1988 | Storah | 138/98 |
| 5,048,174 | * 9/1991 | McGuire | 29/451 |

FOREIGN PATENT DOCUMENTS 0 233 006   8/1987 (EP).

OTHER PUBLICATIONS

"Plastic Liner Takes To Water", New Civil Engineer, Oct. 22, 1987.
Russian paper entitled "Metallurgiya", 1973 edition of the Russian Journal, translation.

* cited by examiner

Primary Examiner—P. W. Echols
(74) Attorney, Agent, or Firm—Larson & Taylor, PLC

(57) ABSTRACT

A method of lining installed pipework which includes the steps of taking a length of liner pipe made from a memory retaining plastics material of external diameter greater than the internal diameter of the pipework to be lined, drawing the liner pipe through a swaging die which is attached directly or indirectly to the pipe to be lined using pulling means under tension attached to the leading end of the liner pipe and threaded through the pipework to reduce the external diameter of the liner pipe by up to 15%, the tension applied by the pulling means being such as partially to restrain the radial expansion of the outer surface of the liner pipe after its emergence from the die, drawing the liner pipe after its emergence from the die, drawing the liner pipe through the installed pipework with its outer diameter reduced to and/or maintained at a dimension less than that of the inner diameter of the pipework and thereafter allowing the liner pipe to expand within the pipework by relaxation of the said tension followed by memory induced expansion at ordinary atmospheric pressure and at the ambient temperature of the pipework.

5 Claims, 2 Drawing Sheets

METHOD FOR THE LINING OF EXISTING PIPES

Figure 1:
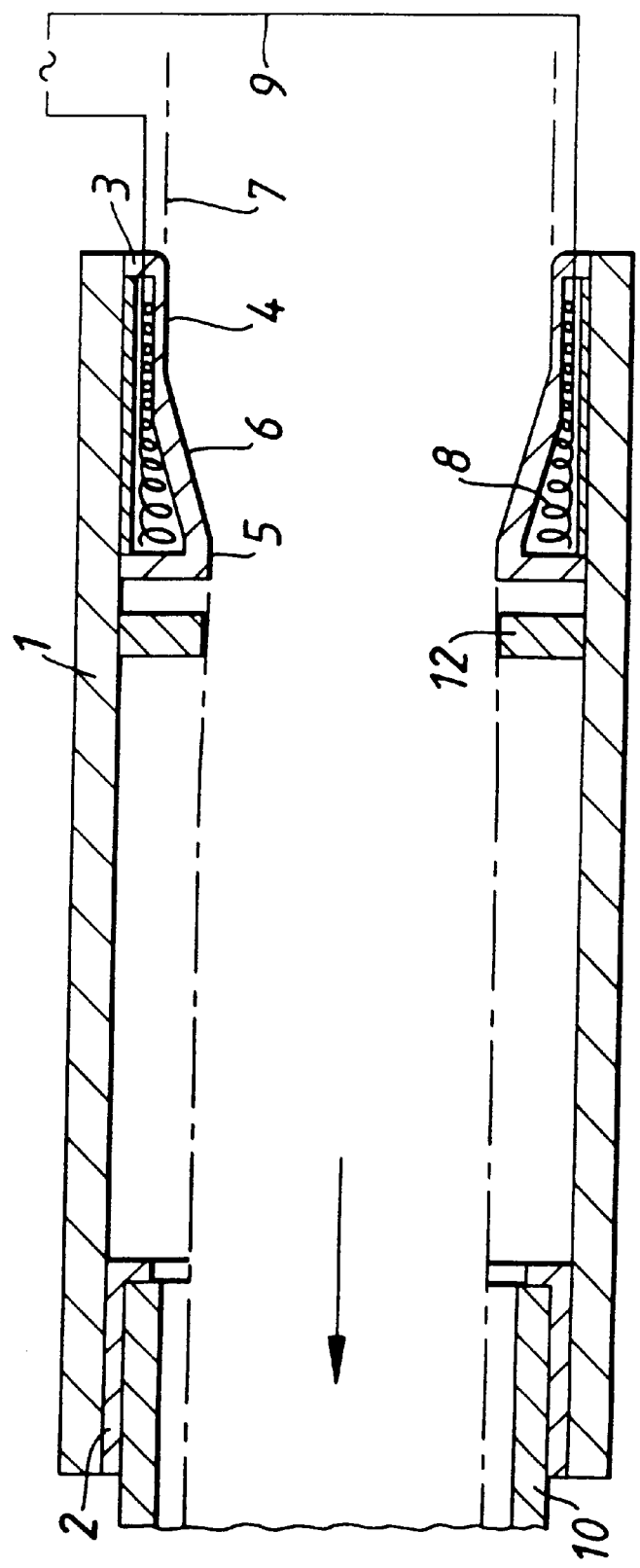

This application is a continuation of application Ser. No. 08/079,991 filed Mar. 5, 1993, now abandoned, which is a continuation of application Ser. No. 07/866,365, filed Apr. 10, 1992, now abandoned, which is a division of application Ser. No. 07/799,096, filed Nov. 27, 1991, now U.S. Pat. 5,214,835, which is a division of application Ser. No. 07/552,900, filed Jul. 16, 1990, now abandoned, which is a division of application Ser. No. 07/349,085, filed May 9, 1989, now abandoned.

This invention relates to a method of and apparatus for the lining of existing pipes. The invention will be described in relation to gas, oil and water supply pipes, but it will be appreciated that the invention is applicable to pipes of all kinds.

When lining installed pipes (which pipes when ground embedded are prone to crack due to ground movement) it is known to draw a heated liner of plastic tube through a die to reduce the diameter and then into a length of the existing pipe.

The present invention relates to an improved method of lining installed pipework when using a swaging die to reduce the diameter of the liner pipe prior to its being drawn into the existing pipework. By "installed" pipework is meant pipework that has already been installed in position to carry out its intended purpose, such as for example, ground embedded pipework for gas, oil, water or sewage, pipework forming part of a larger installation such as in oil or gas refinery or storage installation, or pipework resting on the ground and laid down to connect a source. of supply to the recipient such as an oil pipe connecting a well to a refinery or port.

In the case of ground embedded pipework it will be appreciated that the normal arrangement when such a process is being carried out will involve a winch adjacent to an excavation at one end of a length of pipe to be lined, whence a cable or similar flexible ligament passes through the length of pipe to a second excavation beyond which it is attached to the front end of a liner pipe of plastics material. Adjacent to the second excavation is a tube heating and compressing apparatus which has a heater and a size reduction die. At a downstream end of this apparatus there may be a reciprocatable "pusher" which can grip the pipe and draw it from the apparatus and urge it towards the pipe to be lined.

According to the present invention, there is provided a method of lining installed pipework which includes the steps of taking a length of liner pipe made from a memory retaining plastics material of external diameter greater than the internal diameter of the pipework to be lined, drawing the liner pipe through a swaging die which is attached directly or indirectly to the pipe t o be lined using pulling means under tension attached to the leading end of the liner pipe and threaded through the pipework to reduce the external diameter of the liner pipe by up to 15% the tension applied by the pulling means being such as partially to restrain the radial expansion of the outer surface of the liner pipe after it s emergence from the die, drawing the liner pipe through the installed pipework with its outer diameter reduced to and/or maintained at a dimension less than that of the inner diameter of the installed pipework and thereafter allowing the liner pipe to expand within the pipework by relaxation of the said tension followed by memory induced expansion at ordinary atmospheric pressure and at the ambient temperature of the pipework, In one aspect of the present invention, the liner pipe may be heated by methods known per se prior to the swaging operation. Alternatively, or i n addition, the liner pipe may also be heated during its passage through the swaging die. In such a case, means are provided for heating the internal surface of the swaging die simultaneously with the passage of the liner pipe through it.

According to another aspect of the present invention, the swaging operation may be carried out at ambient temperatures. The choice of liner pipes suitable for swaging at ambient temperatures will depend upon, inter alia, the dimensions of the liner pipe, its SDR ratio and the particular characteristics of material from which the liner pipe is made. Whether in any particular circumstances a liner pipe may be successfully swaged at ambient temperatures is a matter which may easily be ascertained by the operator by way of trial and error.

The present invention envisages in a preferred aspect of its operation the employment of a swaging die that is provided with a surface which, or part of which, is inclined at an angle between 6 degrees and 32 degrees there being no part at an angle of more than 32 degrees to the die axis and which extends over an axial length that is at least 70% of the axial distance between the part where the liner pipe engages with such surface and the part where the liner pipe disengages from the die.

Dies used according to the prior art methods of pipe swaging as employed in practice have comprised two portions, the first being the inclined swaging surface reducing in diameter to a minimum value and the second being an axial continuation of the die interior having its walls parallel to the die axis and an internal diameter equal to such minimum value. We have found that in the carrying out of the present invention, it is advantageous to reduce the axial length of the said second portion relative to the axial length of the first portion, or else to dispense with the second portion altogether. In particular, by so designing the die that the first part extends over an axial distance that is at least 70%, and preferably over 80%, and advantageously over 85% of the axial distance between the part where the liner pipe engages with the inclined surface and the outlet orifice where the pipe emerges from the die, the pulling tension required to swage the liner pipe is substantially decreased. Another consequence of the use of such a die in the carrying out of the present invention is that, when using a liner pipe of synthetic hydrocarbon resins such as polyethylene or modified polyethylene as conventionally used in practice, the liner pipe on emerging from such outlet orifice manifests a greater tendency towards radial expansion relative to the degree of swaging exerted by the die than in the case where, as in the prior art, the swaging die was provided with a second portion as mentioned above of substantial length, typically in the order of 50% of the overall die length. On release of pulling tension such tendency will result in a greater proportional radial expansion in relation to the pulling tension employed than would have occurred using the prior art dies.

The process of the present invention relies both upon the expansion of the liner pipe within the pipework as a result of relaxation of the pulling tension and also as a result of the memory induced expansion of the swaged liner pipe. By the use of a die having a reduced axial length of its second portion relative to the axial length of its first portion as mentioned above the proportionate expansion resulting from the relaxation of the pulling tension may be significantly increased thus resulting in improved control over the pipe lining operation.

The arrangements described above furthermore provide a significant advantage in relation to the case where a "pusher" device as e.g. of the kind described in our co-pending Patent Application UK No. 8806926 is used. It is inherent in the operation of such a pusher that, when it grips the liner pipe and urges it towards the pipework to be lined, there is experienced a temporary reduction in the pulling tension exerted by the pulling device (such as a winch) at the far end of the pipework. Upon the pusher releasing its grip, the tension resorts back to its original value. In practice, this results in a continuous fluctuation in the tension. It is desirable that the changeover between maximum and minimum tensions in the course of the fluctuations be affected as smoothly as possible and with the minimum amount of sharp transitions or jerks.

We have found that as a result of the preferred use of the dies of the present invention which require substantially lower pulling tensions to effect a comparable degree of swaging as compared with prior art dies and which furthermore being about a greater "spring back" tendency on the part of the pipe emerging from the die orifice, the amplitudes of the fluctuations are reduced and the fluctuations themselves become smoother. Having regard to the very high forces involved in exerting the pulling tension, this again constitutes a significant improvement in both the safety and the efficiency of the operations, The length of the pipework which may be lined in a single operation by the method of this invention may typically be from 10 metres upwards. The limiting length of pipework which may be lined in any particular case will depend upon a combination of factors including the friction resistance to the movement of the liner within the pipework, the extent to which the liner pipe with reduced diameter after insertion into the pipework becomes subject to deformation (a problem encountered with larger diameter liner pipes of relatively large SDR ratio), the limiting tension on the leading end of the liner pipe beyond which it may suffer permanent damage or elongation, the capacity of the mechanism (such as a winch) operating the pulling means and the uniformity of diameter and/or direction or otherwise of the pipework interior. The most suitable practicable length to be lined in any particular case can readily be ascertained by trial and error. By the method of the present invention, it becomes possible to line lengths of pipework up to 450 metres or more. The surface finish of the die may be provided by means known in the art. It is preferred that such surface finish should be at least down to N7 typically down to N6 preferably down to N5 and ideally in the order of N4 or lower.

It has been found advantageous to employ a die having a relatively shallow angle of inclination of the inclined surface of the die to the die axis and within the range of 12 degrees to 29 degrees and preferably from 20 degrees to 25 degrees. Reduction of the angle assists in reducing the pulling load required to effect compression of the liner pipe but at the same time increases the area of the swaging surface for any given degree of compression. The optimum angle will be that which, in any particular case, minimises the overall disadvantages of a highload to bring about compression on the one hand and a large friction inducing die surface area on the other hand. The die surface may be frusto conical in shape. Alternatively, it may have a variable angle of inclination to the die axis within the above stated limits. It is a significant and advantageous feature of the present inventor that when using a liner pipe made of a deformable memory retaining material in accordance with the method of the invention, the liner pipe may be left to expand radially within the lined pipework and under the influence of the memory of the material constituting it. By suitable choice of initial diameter of the liner pipe, degree of compression during the swaging operation and die orifice diameter in relation to the internal diameter of the pipework to be lined, the present invention can bring about the provision of a close fitting lining to the pipework resulting, (following relaxation of tension), from the memory induced expansion of the pipelining at the ambient temperatures and pressure within the pipework, It is unnecessary to have recourse to the means provided by the prior art for expanding the pipe lining within the pipework such as the application of internal super atmospheric pressure or the application of heat to the pipelining from within or the initial application of very high stretching forces to the pipelining to bring about an initial reduction in its diameter prior to insertion into the pipework. The precise operating conditions employed in order to carry out the method of the present invention will depend upon the several factors referred to above in any particular case and will vary according to the pipework internal diameter and the purpose for which it is put to use (for example whether for water or gas), the material of the pipelining and the SDR of the pipelining. By SDR is meant the ratio of the diameter of the pipelining before swaging to its wall thickness.

According to a further aspect of the present invention there is provided apparatus for lining an existing pipe comprising a support structure, a swaging die disposed in the structure for reducing the diameter of a liner pipe pulled through it, fixing means enabling the structure to be fixed to the pipe to be lined and, optionally, heater means disposed in the swaging die to enable the die to be heated to heat liner pipe being pulled therethroughs.

A preferred material for the liner pipe is polyethylene, but other materials having the necessary memory retaining characteristics, such as a co-polymer of polyethylene and at least one alphaolefin of up to ten carbo atoms may equally be used. Although the reduction in diameter of the liner pipe during passage through the swaging die may be up to 15%, reductions in the range 5.0% to 9.8% are preferred. The reduction should be such as to allow drawing of the liner pipe through the existing pipe. This somewhat simple requirement is complicated by the fact that existing pipes are often not accurately sized internally, that the internal diameter may vary along the length of the pipe, and that the rate of recovery of the liner pipe may vary with ambient conditions and with the material from which the pipe is made. The wall thickness of the liner pipe should be as thin as possible consistent with the use to which the pipe is to be put and the requirement to provide adequate internal sealing of the existing pipe. A ratio of wall thickness to diameter of the liner pipe in the range 10 to 46 is preferred. The maximum tension chosen for pulling the liner pipe through the existing pipe should advantageously be in the range 45% to 55% of the yield strength of the liner pipe in question, and in particular about 50%. The ratio of the throat diameter of the die to the diameter of the existing pipe should advantageously be in the range 1.05:1 to 1.15;1. A reciprocatable pusher may be employed to augment the tension exerted by the said pulling means to draw the liner pipe through the swaging die.

Figure 2:
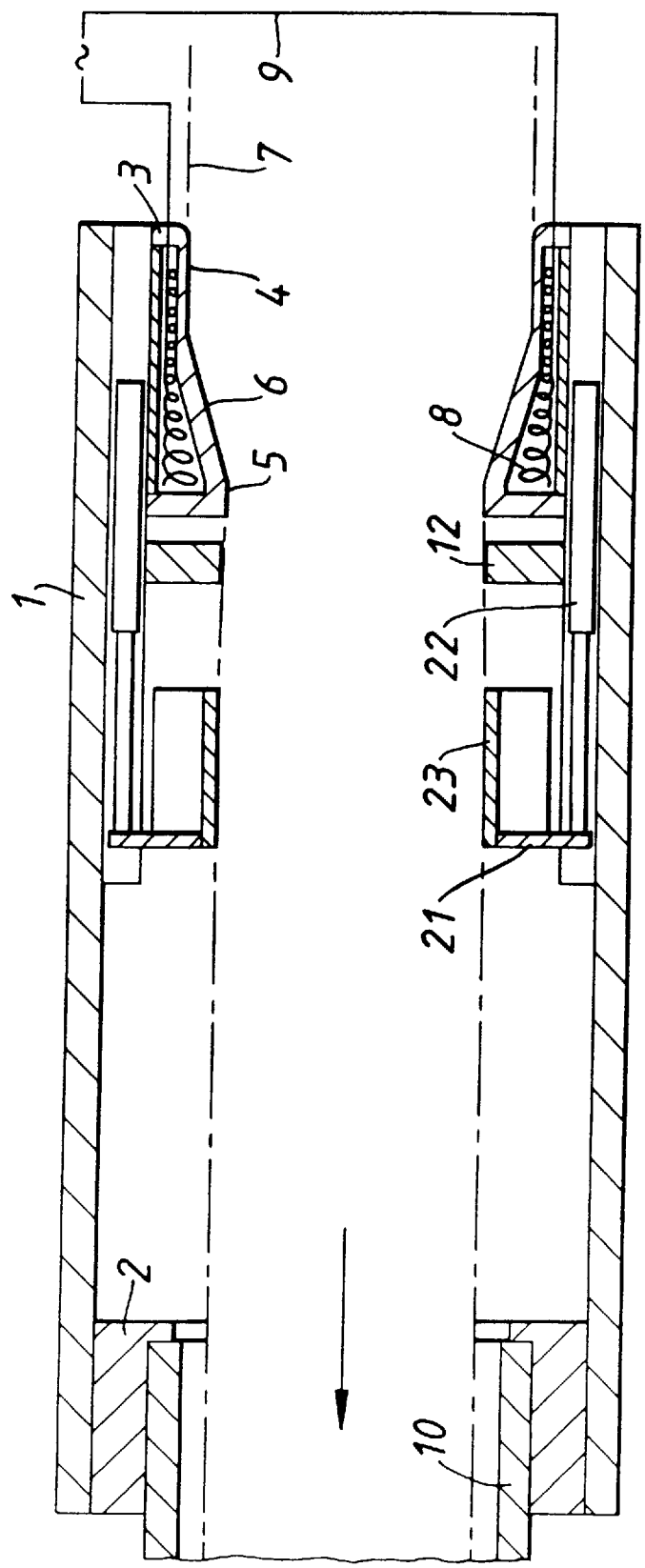

In order that the invention may be more clearly understood one embodiment of the invention will now be desdribed by way of example, with reference to the accompanying drawings, in which:

FIG. 1 is a side elevational view in section of one form of apparatus according to the invention, and FIG. 2 is a side elevational view in section of a modification of the apparatus shown in FIG. 1.

Referring to FIG. 1, the apparatus comprises a supporting structure 1 which incorporates a pipe clamp 2 at one end and a swaging die 3 at the other. The swaging die 3 is generally cylindrical and comprises a section of larger diameter 4 joined to a section of smaller diameter 5 by a conical section 6. The swaging die has a polished swaging surface which is inclined at an angle of between 6 degrees and 32 degrees to the axis of the die advantageously between 12 degrees to 29 degrees and preferably between 20 degrees to 25 degrees. The polish is at least down to N7, typically down to N6 preferably down to N5 and ideally in the order of N4 or lower, The ratio between the diameters at 4 and 5 is preferably in the range 1.05:1 to 1,15:1. This has been found to provide an adequate level of clearance between pipe liner and internal pipe diameter for most normal pipes and to be comfortably within the diametric dimensional recovery of the material.

The body of the die 3 in the embodiment illustrated is hollow and houses an electrical heating coil 8 which is supplied with electricity via an electrical supply circuit 9. Power supply to the heating coil is applied to heat the liner pipe to a temperature within the range 35 degrees centigrade to 95 degrees centigrade and preferably to about 50 degrees centigrade. On leaving the die, the swaged liner pipe is cooled by means of an annular heat exchanger 12 which is disposed around the pipe and which extracts heat from the pipe. The heat exchange medium may be carbon dioxide, air, water or any other suitable fluid, The pipe clamp 2 is fixed to the free end of existing pipe and provides in conjunction with the existing pipe, referenced 10, an anchor against which the liner pipe 7 may be pulled, The supporting structure to which the pipe clamp is connected may be tubular in form or may consist of a plurality of arms connecting the pipe clamp 2 and swaging die 3 together as is shown in the drawings, no pipe rollers are resent between the mouth of pipe 10 and the swaging die 3.

In operation of the apparatus, a length of liner pipe 7 of polyethylene or other suitable material may be mitred at one end or pre-formed effectively to form a nose cone at that end over which an apertured metal nose cone may be fitted. A ratio of wall thickness to diameter of the liner pipe in the range 10 to 46 is preferred. Holes are punched in the mitre sections which correspond with those in the metal nose cone and through which a cable is connected to the pipe. The cable is threaded through the swaging die 3 and the existing pipeline and connected to some form of pulling device such as a winch appropriately anchored. The electrical supply is switched on to heat the die to the required temperature and the mitred end of the liner pipe is introduced into the upstream end of the die, Tension in the cable is increased to the required value (usually between 45% and 55% of the yield strength of the liner pipe in question and in particular 50%) until the liner pipe begins to move through the die and be pulled into the existing pipeline, The liner pipe is pulled in this way completely through the existing pipe. The cable is released and the memory characteristic of the material of the pipe is then permitted to expand the pipe until it contacts the internal surface of the existing pipe.

If desired, the pipe may be assisted through the existing pipe by means of a liner pipe pusher machine. Such an arrangement is illustrated in FIG. 2 of the drawings. Referring to this figure, the pusher machine, which generally comprises a frame 21, hydraulic cylinder 22, clamp ring 23 and ancilliaries is disposed between the swaging die 3 and pipe clamp 2. In operation, this machine pulls the liner pipe through the swagina die 3 and pushes it into the existing pipeline.

It will be appreciated that the above embodiments have been described by way of example only and that many variations are possible without departing from the invention. For example the liner pipe may be heated prior to entry into the swaging die stretches as in the manner described in our co-pending application No. 2186340.

What is claimed is:

1. A method of lining installed ground embedded gas, oil and water supply pipework, said pipework having a mouth and said method including the steps of:

taking a length of liner pipe of at least 10 meters in length and made from a memory retaining plastics material of polyethylene, or a co-polymer including polyethylene, of external diameter greater than the internal diameter of the installed ground embedded pipework to be lined, drawing the liner pipe through a swaging die mounted directly by mounting means at the mouth of the installed ground embedded pipework to be lined at a distance from the mouth of the pipework sufficient to enable a liner pipe pusher machine to operate between the swaging die and the mouth of the pipework, and without any pipe rollers being present between the die and the mouth of the pipework, said drawing being carried out under tension using pulling means threaded through the installed ground embedded pipework and attached to the leading end of the liner pipe to reduce the external diameter of the liner pipe, with the tension applied by the pulling means being such as partially to restrain the radial expansion of the liner pipe after the emergence of the liner pipe from the die to keep the outer diameter of the liner pipe reduced to a dimension less than that of the inner diameter of the pipework, drawing the liner pipe through the installed ground embedded pipework, with the outer diameter of the liner pipe maintained at the dimension by the applied tension while simultaneously pushing the liner pipe using a liner pipe pusher machine, and thereafter allowing the liner pipe to expand within the pipework into close contact therewith by relaxation of the said tension followed by memory induced expansion at ordinary atmospheric pressure and at the ambient temperature of the pipework, the liner pipe being drawn into the swaging die at ambient temperature and no heat being supplied to or generated within the swaging die except for such heat as may be generated by friction between outer surfaces of the liner pipe and inner surfaces of the swaging die during passage of the liner pipe through the swaging die.

2. A method as claimed in claim 1, in which the external diameter is reduced by up to 15%.

3. A method as claimed in claim 1, in which the liner pipe is reduced in diameter during passage through the die by an extent within the range of 1.05:1 and 1.15:1.

4. A method as claimed in claim 1 wherein said die is mounted inside of an elongate tubular supporting structure and is attached to the pipework by clamping one end of the supporting structure to the pipework using a pipe clamp.

5. A method as claimed in claim 4 wherein said tubular supporting structure comprises a continuous tube.

* * * * *